Feb. 28, 1967  R. J. SMITH  3,306,687
SINGLE ROW SPHERICAL BEARING
Filed May 6, 1964  2 Sheets-Sheet 1
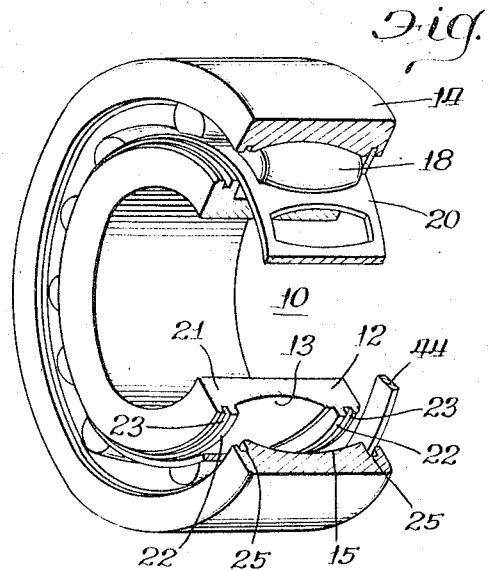
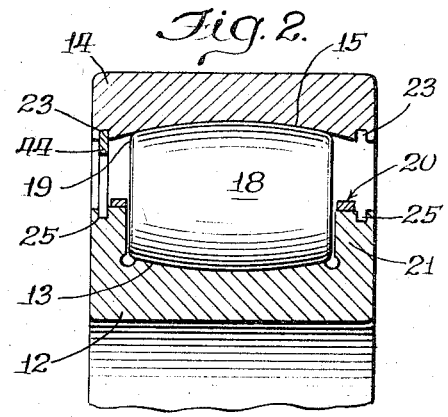
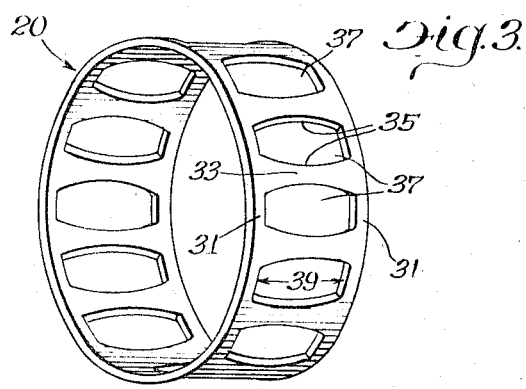
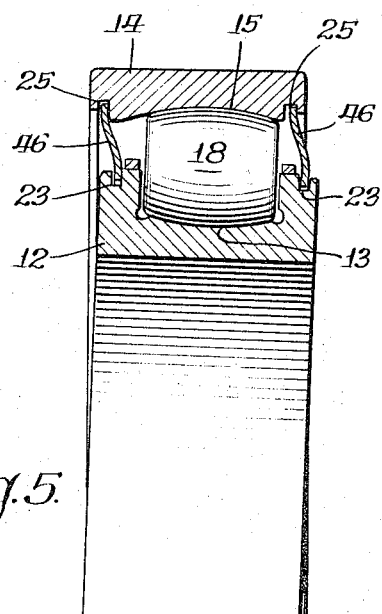
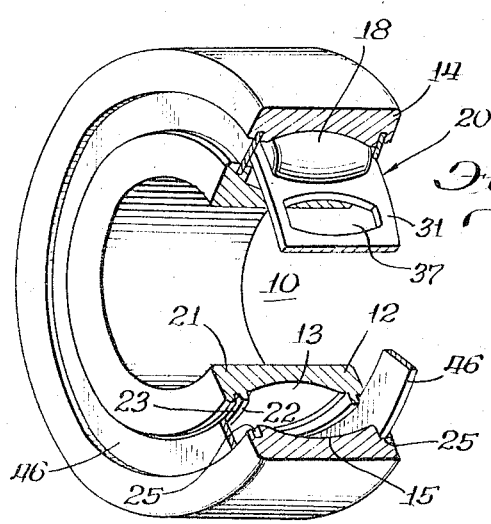
Inventor:
Richard J. Smith Feb. 28, 1967  R. J. SMITH  3,306,687
SINGLE ROW SPHERICAL BEARING
Filed May 6, 1964  2 Sheets-Sheet 2

Inventor:
Richard J. Smith
By: Mueller & Aichele
Attys

# United States Patent Office 3,306,687
Patented Feb. 28, 1967

3,306,687
SINGLE ROW SPHERICAL BEARING
Richard J. Smith, Valparaiso, Ind., assignor to McGill Manufacturing Company, Inc., Valparaiso, Ind., a corporation of Indiana
Filed May 6, 1964, Ser. No. 365,386
5 Claims. (Cl. 308—213)

This application is a continuation-in-part of copending application Serial No. 313,519, filed October 3, 1963, now abandoned, by the same applicant.

This invention relates generally to anti-friction bearing assemblies, and more particularly to an improved bearing assembly of the self-aligning type having barrel rollers and spherical raceways, capable of withstanding thrust as well as radial loads.

Prior art bearing assemblies using a single row of barrel rollers between spherical raceways and containing roller guidance and retention means have been expensive to fabricate and have resulted in less than satisfactory performance. Many known types of single row radial contact spherical bearing assemblies employ a metal cage which is roller riding and adapted to both guide and retain the rollers. The cage is usually a complicated cast part or is constructed of sheet metal with a coined pocket which rides above the pitch circle of the rollers to prevent separation of the bearing assembly, and under vibratory loads or thrust forces the cages tend to distort or to wear out. In other types guidance is achieved by shoulders on the inner race, with the cage functioning primarily to prevent the rollers from falling outwardly of the inner race unit. In the event of roller skewing, and under axially directed loads, there is a tendency for the rollers to bear against the sides of the shoulders on the inner race, increasing wear and frictional drag.

The thrust load capabilities of prior art single row radial contact spherical bearings is very limited in that the rollers cannot adjust themselves in the axial plane and only a small contact angle can develop. Generally, a thrust load component applied to the inner race ring produces horizontal displacement until the end of the roller abuts against the flange on the inner race ring, with the roller axis remaining parallel to the axial center of the bearing. There is a corresponding shift in the contact angle on the roller, and during continuous rotation the roller shifts its axis until the combined radial and thrust loads pass through the center-line of contact and the center of the roller at an angle, with equal and opposite contact angles provided between the roller and the inner and outer raceways. In most practical applications this angle is limited to 3° or less, and accordingly, the thrust capability of prior art bearings of this type is very limited.

In addition, it is often desirable to provide seals at the axial ends of the bearing asembly to exclude foreign material therefrom and to retain lubricant in the assembled bearing. The end seals must be adapted to provide effective sealing even under operating conditions which may cause misalignment of the bearing races, and must be of a structure which will not interfere with operation when the races are misaligned. Because of this misalignment it has been difficult to provide a simple, reliable sealed single row spherical bearing to provide satisfactory operation under heavy duty operating conditions.

It is, therefore, an object of the present invention to provide an improved spherical roller bearing capable of withstanding substantially greater thrust loads than prior art bearings of a similar type.

Another object of the present invention is to provide an improved anti-friction bearing assembly of the type utilizing a single row of barrel rollers disposed between spherical raceways that is extremely simple and economical to fabricate and which results in improved performance when used with loads having an axial thrust component.

Still another object is to provide a single row spherical bearing assembly which is simple in construction and which may be provided with improved end seals operable under vibratory and axially directed loads.

A feature of the invention is the provision of a radial contact spherical roller bearing of the type having barrel rollers disposed between spherical raceways provided on the inner and outer race rings, with flanges on the inner race ring to restrict axial movement of the rollers. A clearance is provided between the roller ends and the flanges that falls within a predetermined range so that under conditions of thrust loads the bearing assumes a required contact angle until a maximum contact angle has been obtained, subsequent to which there is an increase in load zone without an increase in contact angle, enabling the bearing to operate under greater thrust loads.

Another feature of the present invention is the provision, in a single row spherical bearing of the above described type, of a flat, cylindrical cage with punched pockets maintained in land riding relationship on the inner race ring to provide roller spacing. An annular ring is secured in a groove in the outer race ring to maintain the bearing as an assembled unit so that roller retention by the cage is not necessary, with the cage performing a spacing function only.

Still another feature is the provision, in a single row spherical bearing of the above described type, of a thin-walled cylindrical cage with contoured roller spacing pockets disposed around its periphery. Preferably the cage may be formed with the roller pockets punched from flat strip stock, and subsequently rolled and welded into a cylinder.

A further feature is the provision, in single row radial contact spherical bearing of the above described type, of a thin walled cylindrical cage maintained in land riding relationship near the center of the rollers. An annular ring disposed about an annular groove in the outer race ring prevents separation of the outer and inner race ring to maintain the same in an assembled condition so that the cage need only to perform a spacing function.

A still further feature is the provision, in a single row spherical bearing of the above described type, of an annular disc or plate of resilient non-metallic material secured between grooves in the inner and outer race rings at one or both of the axial ends thereof. When the bearing is in operating installation the grooves may face one another or be displaced axially from one another a slight amount, and the annular plates are maintained in contact with the walls of the grooves to function as a seal to exclude foreign particles and to maintain lubricant within the assembled bearing. The annular plates also prevent separation of the inner and outer race rings so that the bearing may be handled as a unit assembly.

Other objects, features and attending advantages of the invention will become apparent from the following description when taken in conjunction with the accompanying drawings, in which:

FIG. 1 is a perspective view, partly in section, of one form of the invention;

FIG. 2 is a cross-section view of a portion of FIG. 1;

FIG. 3 is a perspective view of the roller cage used in FIG. 1;

FIG. 4 is a perspective view, partly in section, of a sealed form of the invention;

FIG. 5 is a partial cross-section of FIG. 4 illustrating sealing action during misalignment of the bearing races;

Figure 6:
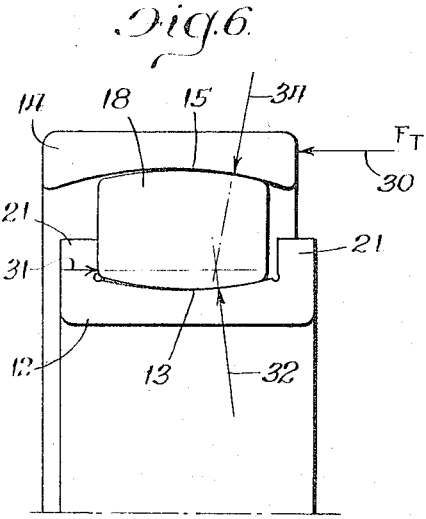
FIGS. 6–8 are simplified cross-sectional views illustrating the manner in which forces having a thrust component act on the rollers and races of the bearing of the invention.

The bearing assembly of the present invention includes a single row of barrel rollers disposed between spherical raceways provided by the inner and outer race rings. It is to be understood that in the specification and throughout the claims the term "spherical roller bearing" refers to corresponding raceways that have a curvature in the axial or transverse direction to thereby provide spherical or eliptical bearing surfaces, with so-called barrel rollers, also having a spherical or elliptical curvature, disposed therebetween. Such a bearing is deemed "single row" when there is but one bank of rollers disposed between the raceways, and primarily used for radial loads. Preferably the inner and outer raceways have a true spherical surface slightly greater than the radius of curvature of the rollers. Thus, the bearing assembly is of the self-aligning type and operates within specified limits of misalignment between inner and outer race units, as determined by the clearance between the roller ends and retaining snap rings or seals in the outer race ring.

According to the present invention the total clearance between roller length and the end flanges on the inner race ring is specifically and structurally related to the roller dimensions, curvature of the inner and outer raceways, and the internal radial clearance (diametral clearance) of the bearing. This total roller-to-flange clearance in turn establishes a maximum contact angle which can be developed between a roller and the raceways, and additional thrust load (with respect to the radial load) will bring additional rollers into contact with the raceways, that is, increase the extent of the load zone. The resulting effect of the maximum contact angle and the increased load zone is similar to that provided by angular contact bearings, and the bearing will assume whatever contact angle required until a maximum contact angle has been obtained. Beyond this point the contact angle will not change, but the extent of the load zone will increase.

A one-piece, thin-walled sheet metal cylindrical cage with contoured roller pockets punched therein is positioned to be land riding on flanges of the inner race near the center of the rollers. The contoured cage pockets are dimensioned so that they do not ride on the rollers.

Separation of the inner and outer race units is prevented by an annular ring secured in a groove on the axial end of the outer race ring. This ring limits movement of the outer race unit with respect to the inner race unit to result in a unit assembly. Alternately, a sealing ring of nylon or similar non-metallic material may be secured in grooves in the axial ends of the inner and outer race rings, and allowed to distort throughout their range of self-alignability. Such a ring performs the dual function of sealing the bearing assembly and providing a unit assembly.

Referring now more specifically to the drawings, in FIG. 1 bearing 10 has an inner race ring 12 and an outer race ring 14. Inner race ring 12 includes annular raceway 13 while outer race ring 14 includes annular raceway 15. As can be best seen in cross-section in FIG. 2, raceways 13 and 15 are curved in the axial direction of the bearing, with the radius of curvature thereof being greater than the radius of either race ring. When race rings 12 and 14 are in an assembled condition, raceways 13 and 15 provide a bearing surface for a plurality of barrel rollers 18. As noted, rollers 18 have a spherical or elliptical curved surface extending in their axial or transverse direction, and have substantially flat end surfaces. The corners 19 where the major spherical surface of a roller joins its flat end surfaces are rounded, being provided with a radius substantially less than the radius of curvature of the spherical surface of the roller.

Inner race ring 12 includes shoulders or flanges 21 on each axial end to define the limits of raceway 13. Shoulders 21 extend radially outwardly towards the center of rollers 18. It is to be noted, however, that lands 22 of shoulder 21 terminate a distance somewhat less than the center of rollers 18 so that cage 20 is land riding at the approximate center of rollers 18. Raceway 15 is continuously curved to extend to the axial ends of race ring 14 and there are no flanges on the axial ends of raceway 15. Lands 22 on shoulders 21 of inner race ring 12, and the axial ends of outer race ring 14, include annular grooves 23 and 25 respectively, such that when the race rings are in axial alignment grooves 23 and 25 are either facing one another or slightly axially displaced.

Cage 20 (FIG. 3) includes annular rim portions 31 at the axial ends thereof, joined by connecting cross bars 33. Inner edges 35 of cross bars 33 are contoured so that adjacent ones thereof produce a plurality of contoured roller pockets 37, circumferentially spaced around the periphery of cage 20. Since the cage does not retain the rollers, pockets 37 have a circumferential dimension slightly larger than the roller diameter. It is also to be noted that since the peripheral surface of cage 20 is flat, it may be readily punched to the desired configuration from flat strip stock and then subsequently rolled and welded into cylindrical form. In an assembled bearing, cage 20 is positioned so that rim portions 31 are land riding on the portions of lands 22 that lie axially inward from grooves 23. The axial length of contoured pockets 37, as shown by dimension 39 in FIG. 3, is greater than the spacing of flanges 21 so that when race rings 12 and 15 are in axial alignment and in an assembled bearing, a clearance falling within a predetermined range, as subsequently discussed, is provided between the axial ends of rollers 18 and the sides of flanges 21.

In the embodiment of FIG. 1, the bearing races are maintained as a unit assembly by snap ring 44, which is disposed in one of grooves 25 in the axial end of outer race ring 14. Any tilt or misalignment of inner race ring 12 with respect to outer race ring 14 will result in the axial ends of rollers 18 being restricted by snap ring 44, either at the top or bottom of the bearing assembly. It should be apparent from the curved bearing surfaces provided by raceways 13 and 15, that the bearing assembly can be disassembled only by tilting the inner race ring with respect to the outer race ring, and such tilt is restricted by snap ring 44 to maintain a unit assembly. Snap ring 44 does not, however, contact the roller ends in normal operating installation.

In operating installation, cage 20 rides on lands 22 of shoulders 21 of inner race ring 12. As previously mentioned, shoulders 21 extend radially outwardly to approximately the center of rollers 18 so that cage 20 may be maintained at or near their axial center. Rollers 18 ride on contoured edges 35 of pockets 37 so that there is no tendency to ride up in pockets 37. Since separation of race rings 12 and 14 is prevented by snap ring 44, it is not necessary that cage 20 retain rollers 18, thereby eliminating the necessity for staking or providing tangs on cage 20.

In the embodiment of FIGS. 4 and 5, snap ring 44 may be replaced by sealing rings 46 at one or both axial ends of the assembled bearing. Sealing rings 46 are of nylon or similar flexible plastic material and of sufficient width to extend between the grooves 23 and 25 in the inner and outer race rings. Sealing rings 46 make a loose fit with grooves 23 and 25, and extend into the grooves a sufficient depth so as not to be dislodged therefrom for the maximum permissible misalignment of race rings 12 and 14. Thus, sealing rings 46 function in the same manner as snap ring 44 to restrict angular movement of the outer race ring 14 with respect to inner race ring 12, and at the same time provide simple and reliable end seals for an assembled bearing. For ease of manufacture, rings 46, as with ring 44, may be snapped into place subsequent to assembly of the rollers and the cage with the race rings. In addition, the simplicity of the construction of rings 46 allows sealing within a minimum of space on the bearing races.

Referring to FIG. 5, an assembled bearing is illustrated in a condition of misalignment to show the position of rings 46 under such condition. It can be seen that ring 46 is flexed to maintain contact with the side walls of grooves 25 in outer race ring 14. Contact is made with the innermost side wall of the groove in one instance and with the outermost side wall of the groove in the other instance, depending on the direction of misalignment. In addition, like contact is made with the side walls of grooves 23 in inner race ring 12. Contact of ring 46 with the side walls of grooves 23 and 25 prevent separation of race rings 12 and 14 to provide a unit assembly so that cage 20 need only to perform a spacing function, while at the same time there is provided a contact-type lubricant seal at the axial ends of an assembled bearing.

Grooves 23 and 25, as well as the extension of rings 46 therein, are sufficiently deep so that contact is maintained over the permissible range of misalignment of race rings 12 and 14. When race rings 12 and 14 are in substantial alignment, rings 46 provide at least a labyrinth-type seal in grooves 23 and 25, and under most operating conditions a contact-type seal will be provided in one or both of grooves 23 and 25. Although not limiting, satisfactory results have been obtained with the depth of grooves 23, 25 of the same approximate dimension as the thickness of rings 46, and with the radial portion of rings 46 being in the order of 8–12 times their thickness. The groove widths may be approximately 20–30 percent wider than the thickness of rings 46.

From the foregoing it is apparent that grooves 25 in outer race ring 14 may be of a dimension which will receive either snap ring 44 or will provide the desired fit for sealing rings 46. In addition, grooves 23 in inner race ring 12 may be provided as needed in inner race ring 12 to complete the seal when rings 46 are used in the embodiment shown in FIGS. 4 and 5. Such grooves, when provided with the unsealed embodiment of FIGS. 1 and 2, in no way interfere or detract from normal operation of the bearing. This arrangement allows for effective use of standardized parts to enable flexibility in providing both unsealed and sealed versions of the improved bearing of the invention.

Figure 7:
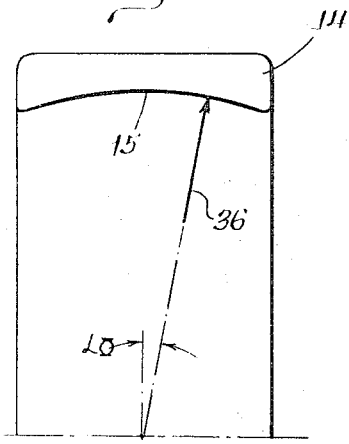
Figure 8:
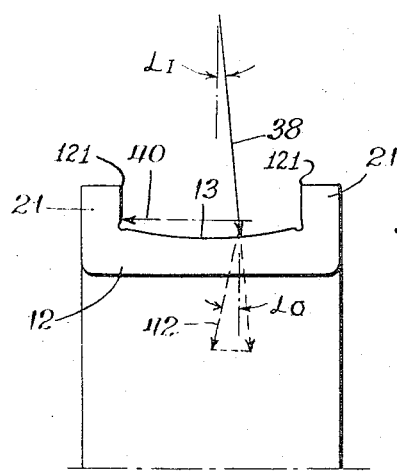

The manner in which a predetermined clearance between rollers 18 and the inner surfaces of shoulders or flanges 21 improve the thrust capabilities of the described bearing can be seen from the following discussion, when taken in conjunction with FIGS. 6–10. When a thrust load (arrow 30, FIG. 6) is applied to the bearing the outer race ring 14 moves axially in the direction of the thrust force applied to the outer race ring to result in a reacting force between the roller end and flange 21 on the inner race ring (arrow 31, FIG. 6), and contact angles with the raceways develop as shown. These contact angles indicate the lines of action of forces acting on the most heavily loaded roller 18, due to contact with the inner and outer raceways, as indicated by arrows 32 and 34. These contact angles are not equal, and do not lie on the same line of action through roller 18. FIGS. 6–8 represent a typical force distribution of an example of both radial and thrust loads, the externally applied thrust load being equal to 20% of the externally applied radial load. FIG. 6 shows forces acting on roller 18 due to contact with the inner and outer raceways 13 and 15, respectively, as the result of an axially directed thrust applied to outer race ring 14. FIG. 7 shows the outer raceway-roller contact force acting at contact angle $\alpha_O$ (arrow 36). FIG. 8 shows the inner raceway-roller contact force acting at contact angle $\alpha_I$ (arrow 38), as well as the force between inner race ring flange 21 and the roller end (arrow 40). The resulting force $F_R$ (arrow 42, FIG. 8) of these two forces acts on the inner race ring at angle $\alpha_O$, and in a direction opposite to the outer raceway-roller contact force of FIG. 7. Thus the forces acting on roller 18 are in balance and the outer race ring contact force and the resultant inner race ring force act along the same line, which is the line of action determined by contact angle $\alpha_O$.

The contact angles that develop are the result of the angular movement of the roller about its center of curvature and are determined by the relationship of thrust load to radial load, the internal contour radii of the inner and outer raceways and the rollers, the internal radial clearance (diametric clearance), and the axial internal clearance between the roller ends and the restricting side flanges on the inner race ring. These factors will determine the maximum contact angle that can be developed and they are such that when the maximum contact angle has been obtained additional axial thrust load (with respect to the radial load) brings more rollers into contact with the raceways, that is, increases the extent of the load zone, and the increase in the extent of the load zone will be similar to that obtained with a normal angular contact bearing. In other words, the bearing will assume whatever contact angles are required to balance increasing external forces until a maximum possible contact angle has been obtained. Beyond this point the contact angles will not change but the extent of the load zone will increase in order to balance external forces.

Figure 9:
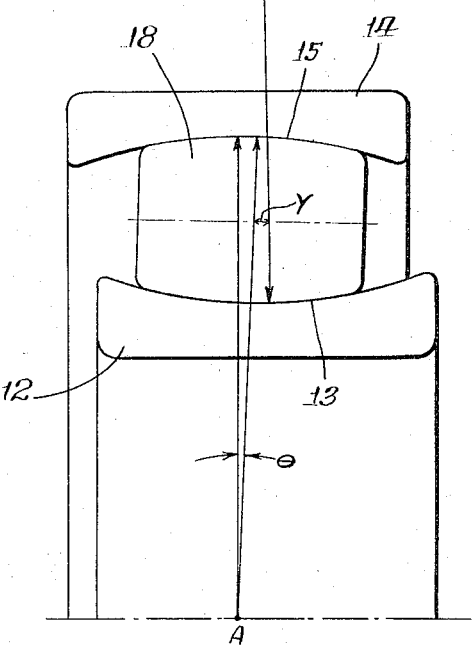
FIG. 9 is a simplified view of a roller with a thrust load applied and without restricting flanges on the inner race ring, helpful in understanding the invention.

Referring now to FIG. 9, there is shown a bearing without restricting flanges on inner race ring 12 to illustrate the maximum possible angular movement of roller 18. The angle $\theta$ indicates the amount of roller movement about the center of curvature of the roller contour, and is the angle between a line perpendicular to the bearing axis and a line joining the center of curvature of the roller contour and the center of the roller itself. It may be shown that:

$$\cos \theta = \frac{R_O + R_I - D_R - K/2}{R_O + R_I - D_R} \tag{1}$$

where $R_O$ = outer raceway curvature,
$R_I$ = inner raceway curvature,
$D_R$ = roller major diameter, and
$K$ is the total radial clearance in the bearing.

The radial clearance $K/2$ (i.e., the radial distance from the low point of the inner raceway curvature to the high point of the outer raceway curvature less the major diameter of the roller) may be expressed by:

$$K/2 = R_O + R_I - D_R - X \tag{2}$$

where X is the distance between the centers of curvature of the inner and outer raceways when both race rings are in alignment (i.e., the radial distance between points A and W of FIG. 9).

Assuming for the moment no restricting end flanges on the inner race ring (as shown in FIG. 9) the possible movement Y of a roller along a line parallel to the bearing axis can be shown to be:

$$Y = \left(R_I - \frac{D_R}{2}\right) \sin \theta \tag{3}$$

It has been found that in order for the bearing to function to result in the improved thrust capabilities discussed above, the minimum restriction on roller axial movement, as provided by flanges 21, should be 1/10 of the possible roller movement (with no restricting end flanges) times the roller diameter to length ratio. Accordingly, $$L_{I(min.)} - L_{R(max.)} = \frac{\left(R_I - \frac{D_R}{2}\right) \sin \theta \frac{D_R}{L_R}}{10} \quad (4)$$

where
$L_R$ = roller length, and
$L_I$ = inner raceway width between flanges.

Figure 10:
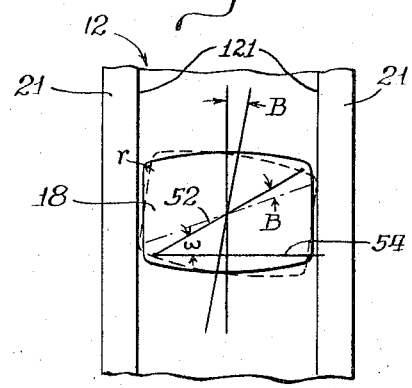
FIG. 10 is a simplified view of a roller in a skewed position further useful in understanding the invention.

It has further been found that the maximum allowable end clearance should be a function of a maximum allowable roller skew of 1°. This is illustrated in FIG. 10, which is a simplified partial top view of a single roller disposed in raceway 13, between end flanges 21. The solid line represents the roller under normal conditions, and the dotted line represents the maximum possible roller skew. Roller skew $\beta$ has been greatly exaggerated for clarity of illustration. The expression for determining maximum roller end clearance, for $\beta = 1°$ skew, is:

$$L_{I(max.)} - L_{R(min.)} = (L_R - 2r)\left[\frac{\cos(\omega - 1°)}{\cos \omega} - 1\right]$$

where $r$ is the radius of the roller corners 19 which join its major spherical surface with its end surfaces, and $\omega$ is the angle formed between a line extending through diagonally opposite corners (line 52) of the roller 18 and the axis of the roller (line 54), to the points where the roller contacts the inner edge 121 (FIGS. 8, 10) of each outer circumferential surface of each guide flange 21 in the maximum allowable roller skew position of one degree.

It is to be understood that the single row spherical bearing set forth above may be utilized in other forms than those specifically described. For example, the axial ends of the inner race ring may be extended and in conjunction with a locking collar be used in pillow block applications. These and other modifications may be made without changing cage 20 or snap ring 44, or rings 46 when the sealed version is employed.

The invention provides, therefore, an improved single row radial contact spherical bearing which is economical to manufacture and which provides high performance under heavy duty applications. The bearing is particularly adapted to operate under thrust loads not heretofore possible with similar type prior art bearings. In addition, a simplified cage structure for roller spacing enhances operating life. A unit assembly is provided by a snap ring which limits relative movement of the race units to prevent separation thereof for ease of handling, and eliminates the necessity of a complex cage structure for roller retention. Alternately an annular non-metallic ring may be disposed in grooves in the inner and outer race rings to provide a unit assembly while at the same time providing a lubricant seal at the axial ends of the bearing assembly.

What is claimed is:

1. In a single row self-aligning bearing having inner and outer race rings and a plurality of rollers therebetween making up a bearing capable of accommodating a radial load and a thrust load impressed thereon and capable of operating with the rollers and inner race ring thereof misaligned relative to the outer race ring, said plurality of rollers each having a radius of curvature for its outer circumferential surface providing an axially convex contour, and with said outer race ring having an axially concave spherical raceway but having no flanges at the sides of said ring to define a raceway and having a radius of curvature with the origin thereof at the axial center of the assembled bearing, said radius of curvature of said outer race ring raceway being substantially the same as the radius of curvature of each roller surface, the means in said bearing to produce said load capability for said bearing comprising said inner race ring having an axially concave raceway with a radius of curvature substantially the same as the radius of curvature of the surface of each of said rollers and having a guide flange at each side thereof defining a raceway in said inner race ring, said inner race ring having an axial center, said guide flanges on said inner race ring being spaced apart a dimension greater than the axial length of the rollers and being within a dimensional range wherein the minimum allowable total of the end clearances between a roller and said two guide flanges is one-tenth of an axial movement of said roller in said bearing in a direction relative to the axial center of said inner race ring if there were no guide flanges on the inner race ring and the axially concave extended the full width of the inner race ring multiplied by the roller diameter to roller length ratio, and wherein the maximum allowable total of the end clearances between said roller and said two guide flanges on said inner race ring permits only a maximum angle of roller-skew of 1 degree for said roller in the inner raceway between said two guide flanges.

2. In a single row self-aligning bearing having inner and outer race rings and a plurality of rollers therebetween making up a bearing capable of accommodating a radial load and a thrust load impressed thereon in any direction and capable of operating with the rollers and inner race ring thereof misaligned relative to the outer race ring, said plurality of rollers each having a radius of curvature for its outer circumferential surface providing an axially convex contour, and with said outer race ring having an axially concave spherical raceway but having no flanges at the sides of said outer race ring to define a raceway and having a radius of curvature with the origin thereof at the axial center of the assembled bearing, said radius of curvature of said outer race ring raceway being substantially the same as the radius of curvature of each roller surface, the means in said bearing to produce said load capability for said bearing comprising said inner race ring having an axially concave raceway with a radius of curvature substantially the same as the radius of curvature of the surface of each of said rollers and having a guide flange at each side thereof defining a raceway in said inner race ring, said inner race ring having an axial center, said guide flanges on said inner race ring being spaced apart a dimension greater than the axial length of the rollers and being within a dimensional range wherein the minimum allowable total of the end clearances between each roller and said two guide flanges is one-tenth of an axial movement of a roller in said bearing in a direction relative to the axial center of said inner race ring if there were no guide flanges on the inner race ring and the axially concave raceway extended to the full width of the inner race ring multiplied by the roller diameter to roller length ratio, which is determined by $$\frac{\left(R_I - \frac{D_R}{2}\right) \sin \theta \left(\frac{D_R}{L_R}\right)}{10}$$

and wherein the maximum allowable total of the end clearances between each roller and said two guide flanges on said inner race permits only a maximum angle of roller-skew of 1 degree for each roller in the inner raceway between said two guide flanges which is determined by $$(L_R - 2r)\left[\frac{\cos(w - 1°)}{\cos w} - 1\right]$$

where $R_I$ is the radius of curvature of the inner raceway,
$D_R$ is the major diameter of a roller,
$L_R$ is the length of a roller,
$r$ is the radius of said corners joining the major surface and the end surfaces of a roller,
$w$ is the angle formed between a line extending through diagonally opposite corners of a roller and the axis of a roller where said roller contacts the inner edge of each outer circumferential surface of each of said guide flanges in the maximum skewed position of the roller, and $\theta$ is the angle formed is a line perpendicular to the axial center of the bearing, said bearing having an inner race ring with no guide flanges and with the axially concave inner raceway extended to the full width of the inner race ring, and a line joining the center of curvature of the roller contour and extending through the axial center of the roller, with $\theta$ thereby defining roller angular movement under radial and thrust loads and determined by $$\cos^{-1}\left[\frac{R_O + R_I - D_R - K/2}{R_O + R_I - D_R}\right]$$

where $R_O$ is the outer raceway radius of curvature, and
$K/2$ is the radial clearance of the bearing, determined by $$R_O + R_I - D_R - X$$

X being the distance between the centers of curvature for the inner and outer raceways.

3. In the bearing of claim 1, a cage structure having annular rim portions land riding on said two guide flanges on said inner race ring, said rim portions being joined by cross-bars which provide pockets in the cage structure, and with said cage structure separating the rollers in the raceways.

4. In the bearing of claim 1 which includes an annular groove opening from the inside of the outer race ring near at least one axial end of said outer race ring, an annular groove opening on the outside of said inner race ring near at least one axial end thereof, and an annular sealing member positioned between said outer race ring and said inner race ring in said grooves in each said race ring, with the inner and the outer peripheral surfaces of said sealing member extending into and making sliding contact with said grooves, said annular sealing member being of a flexible nonmetallic material which flexes and remains in said grooves when said race rings are misaligned with respect to one another.

5. In the bearing of claim 1 wherein each race ring has at least one annular radially extending groove therein near one axial end of that ring opening into the inside of that race ring, with said grooves being oppositely disposed in said bearing, a seal of plastic material comprising a single plate-like member positioned in said grooves and extending radially between said race rings, and with said seal flexing upon misalignment of the race rings relative to one another and remaining in the grooves upon said flexing to seal the bearing at that axial end.

References Cited by the Examiner

UNITED STATES PATENTS

| | | | |
|---|---|---|---|
| 1,193,019 | 8/1916 | Hughes | 308—212 |
| 1,625,812 | 4/1927 | Leon | 308—212 |
| 3,113,813 | 12/1963 | Lobeck | 308—187.2 |

MARTIN P. SCHWADRON, *Primary Examiner.*

ROBERT C. RIORDON, *Examiner.*

F. C. HAND, F. SUSKO, *Assistant Examiners.*